United States Patent
Gazzara et al.

(10) Patent No.: US 7,811,500 B2
(45) Date of Patent: Oct. 12, 2010

(54) METHOD FOR MANUFACTURING A SPORTS RACQUET

(75) Inventors: Roberto Gazzara, Mestre (IT); Mauro Pinaffo, Camposampiero (IT); Michele Pozzobon, Fossalunga di Vedelago (IT); Mauro Pezzato, Treviso (IT)

(73) Assignee: Prince Sports, Inc., Bordentown, NJ (US)

( * ) Notice: Subject to any disclaimer, the term of this patent is extended or adjusted under 35 U.S.C. 154(b) by 562 days.

(21) Appl. No.: 11/707,845

(22) Filed: Feb. 15, 2007

(65) Prior Publication Data

US 2007/0238560 A1  Oct. 11, 2007

(30) Foreign Application Priority Data

Apr. 11, 2006  (EP)  ................... 06112486

(51) Int. Cl.
*A63B 59/00* (2006.01)
*A63B 49/02* (2006.01)

(52) U.S. Cl. ................ 264/314; 473/516; 473/524; 473/535; 473/536; 264/299; 264/313

(58) Field of Classification Search ............... 264/314; 473/524, 535

See application file for complete search history.

(56) References Cited

U.S. PATENT DOCUMENTS 4,194,738 A  3/1980  Inoue (Continued)

FOREIGN PATENT DOCUMENTS

DE  202 17 514 UI  2/2006

(Continued)

OTHER PUBLICATIONS

European Patent Office, Extended European Search Report for EP06122718.7, May 9, 2007.

(Continued)

*Primary Examiner*—Christina Johnson
*Assistant Examiner*—Magali P Slawski
(74) *Attorney, Agent, or Firm*—Abelman, Frayne & Schwab

(57) ABSTRACT

The present invention relates to a method for manufacturing at least a portion of a sports racquet frame that comprises a step a) of providing a moldable tube structure containing a first inflatable bladder and a second inflatable bladder. The first and second inflatable bladders are positioned on opposite first and second regions of the moldable tube structure. At an intermediate region, the tube structure comprises one or more cross channels, which pass through the moldable tube structure. The method according to the present invention comprises also a further step b) of inserting said tube structure inside a mold forming a mold cavity of a desired shape. Mold members are inserted into the cross channels of the tube structure, so that the outer surface of the mold member faces the inner surface of the corresponding cross channel. The mold members have position and orientation that correspond to the position and orientation, along the string bed plane, of the string port holes, which are to be formed on said frame portion. The method, according to the present invention, comprises also a step c) of pressurizing the first and second bladders, so that the tube structure conforms to the shape of the mold, and heating the mold, so that the tube structure cures. The method, according to the present invention, comprises a further step d) of removing the cured tube structure from the mold cavity and removing the mold members from the cross channels.

11 Claims, 13 Drawing Sheets

U.S. PATENT DOCUMENTS

| | | | |
|---|---|---|---|
| 4,436,305 A | | 3/1984 | Fernandez |
| 5,505,492 A | * | 4/1996 | Nelson et al. ............ 280/819 |
| 5,516,100 A | * | 5/1996 | Natsume ................. 473/535 |
| 6,592,475 B2 | * | 7/2003 | Poggi et al. ............. 473/524 |
| 2003/0104152 A1 | | 6/2003 | Sommer |
| 2005/0153799 A1 | | 7/2005 | Rigoli |
| 2005/0266940 A1 | | 12/2005 | Filippini |
| 2006/0172828 A1 | | 8/2006 | Pezzato et al. |

FOREIGN PATENT DOCUMENTS

| | | |
|---|---|---|
| GB | 1 312 543 A | 4/1973 |
| GB | 2110977 | 6/1983 |
| WO | WO94/26361 | 5/1994 |
| WO | WO2004/075996 | 9/2004 |

OTHER PUBLICATIONS

U.S. Appl. No. 11/584,200, filed Oct. 20, 2006, Gazzara et al.

* cited by examiner

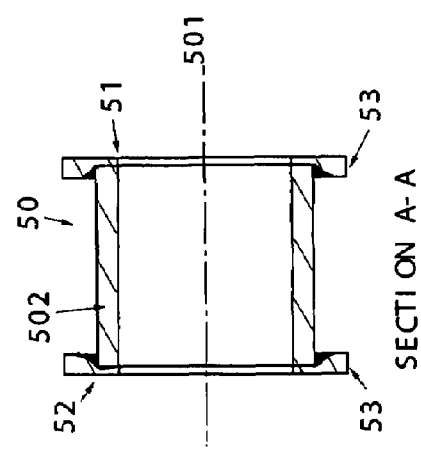
FIG. 9a
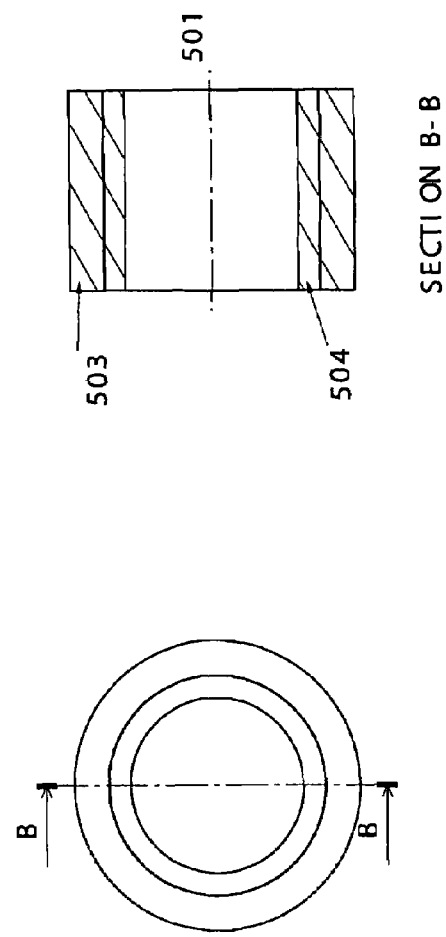
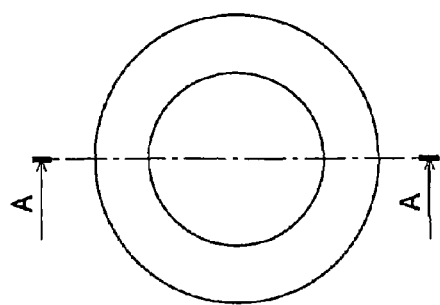
FIG. 9b

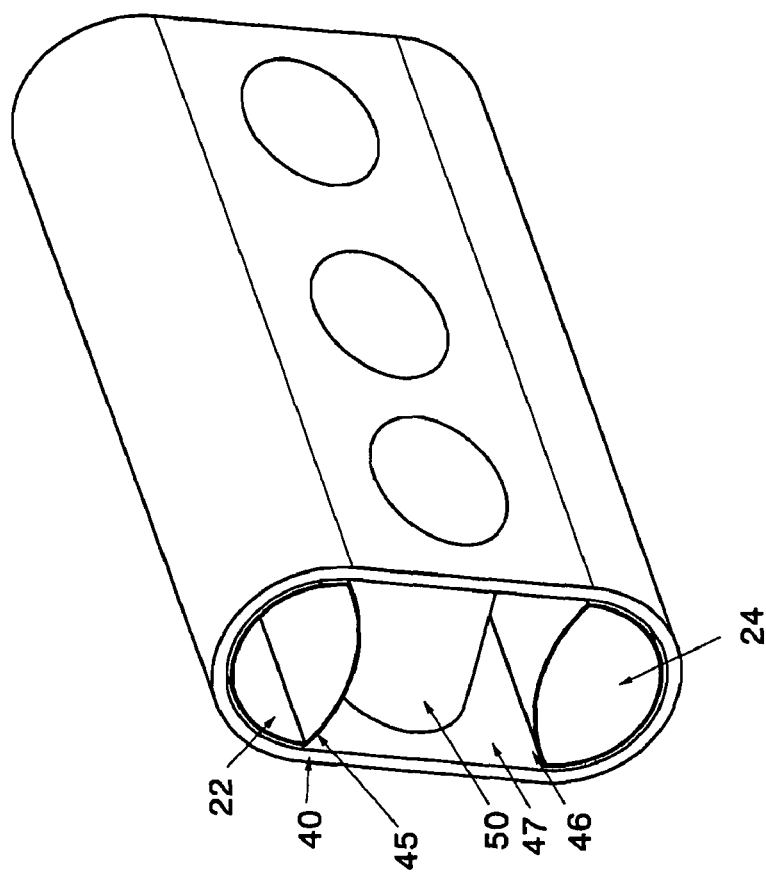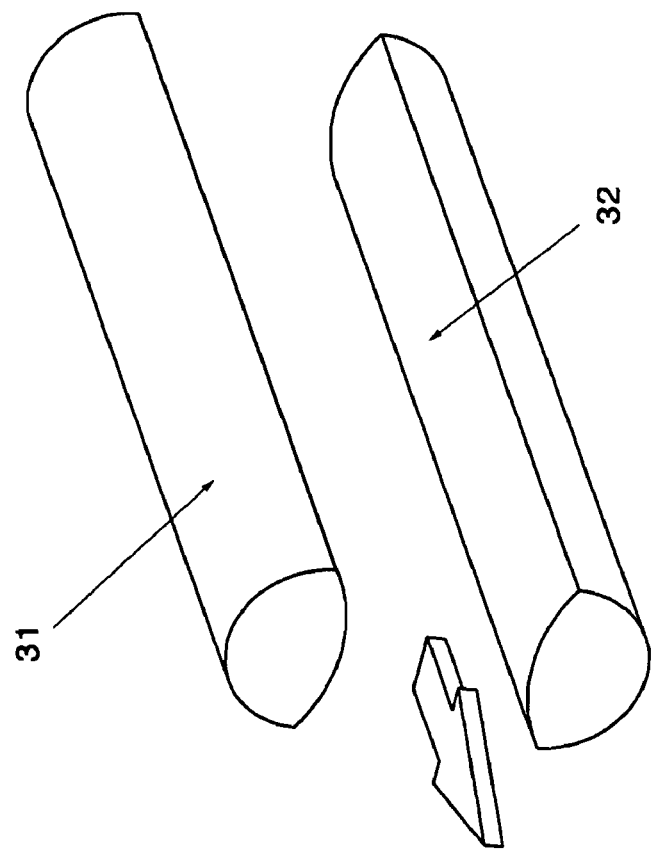
Fig. 10

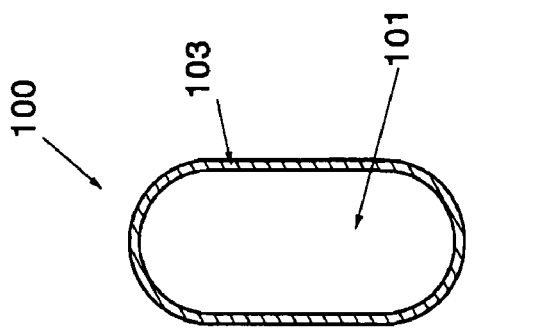
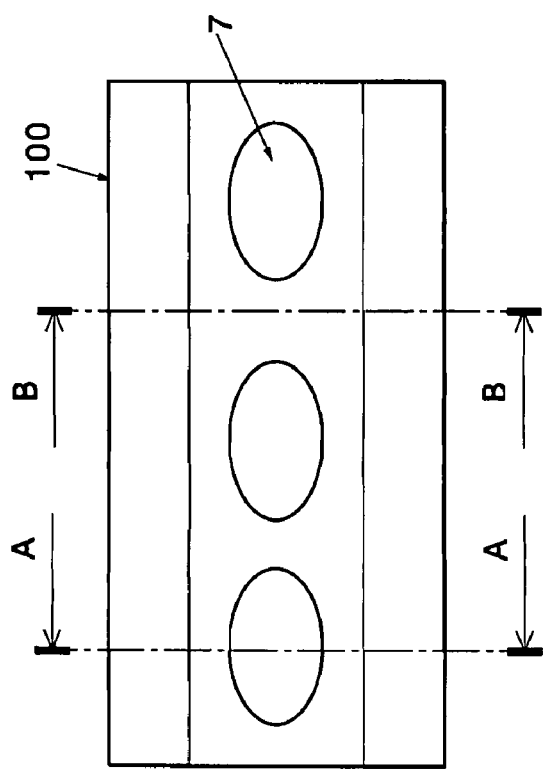
Fig. 13
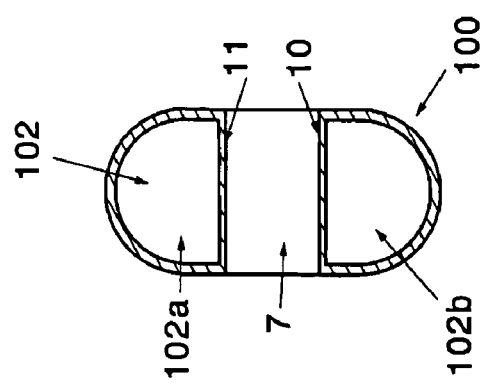

METHOD FOR MANUFACTURING A SPORTS RACQUET

The present invention relates to a method for manufacturing a sports racquet and a sports racquet obtained by said method, which may be, for example a tennis, squash, badminton, or racquetball racquet. More particularly, the present invention relates to an improved method for manufacturing a sports racquet comprising a racquet frame formed by a single tube and provided with enlarged string port holes therein.

Sports racquets have a head portion containing an interwoven string bed, a handle, and a shaft portion connecting the head portion to the handle.

In conventional racquets, holes for anchoring the ends of the strings are formed in the frame by drilling small string holes in the frame after the racquet is molded. Generally, each string hole accommodates a single string. Plastic grommet pegs, which are formed on grommet and bumper strips that extend along the outside surface of the frame, extend through the string holes to protect the strings from the sharp edges of the drilled holes.

Co-owned PCT application WO 2004/075996 discloses a sports racquet, in which some adjacent pairs of small string holes along the sides, tip, and throat bridge of the racquet are replaced by enlarged string holes having two inwardly facing string bearing surfaces, which are spaced apart by a distance corresponding to the distance between two contiguous main strings or cross strings (referred to herein as "string ports holes"). Preferably, the frame is formed of a double tube of carbon fiber-reinforced composite material (a so-called graphite frame), in which the string port holes are molded into as the racquet is pressure molded. As a result of using two tubes, each forming one-half of the enlarged string hole, the string holes can have rounded edges and do not require the use of grommet pegs or strips. Also, in the regions between string holes, the adjoining walls of the two tubes are fused together to form a stiffening wall inside the frame. The result is a racquet, which has improved torsional stiffness and lighter weight. The racquet is made in a mold having a mold cavity in the desired shape of the frame. The mold has two halves. A prepreg tube containing an inflatable bladder is placed in each mold half. A plurality of mold insert members, having an outside surface in the desired shape of the string port holes, as well as a plurality of pins to form conventional string holes, are positioned between the two prepreg tubes and the mold is closed. The bladders are then inflated while the mold is heated to cure the composite resin. After removing the racquet frame from the mold, the mold insert members and pins are removed leaving string port holes and conventional string holes, respectively.

Although such a manufacturing method has shown to be quite effective in the manufacturing of high quality racquet frames with string port holes, it has been seen that production costs are relatively high. This fact necessarily entails higher purchasing costs for the final consumer and/or lower margins for the provider.

It is possible to form a racquet with string port holes using a single frame tube. For example, the racquet frame can be molded from a single prepreg tube, with the holes being drilled after molding. However, drilling holes, particularly drilling large holes such as the string port holes, is a kind of post-curing operation on the molded racquet frame, which may weaken the molded frame, given the fact that the frame fibers are broken. Alternatively, it is possible to manufacture the frame by molding two frame halves separately, and then joining the two halves, e.g., by gluing, welding, fusing, or electro-fusing. Unfortunately, these solutions have shown to be quite complicated to be carried out on industrial large-scale manufacturing processes and to entail relatively high production costs.

The overall object of the present invention is to provide an improved method of manufacturing a racquet frame, one or more portions of which comprise port string holes are formed from a single frame tube.

Within this overall object, it is a particular object of the present invention to provide an improved method of manufacturing a racquet frame, in which port string holes are formed avoiding those post-curing operations, such as drilling, which may weaken the racquet frame after the racquet frame is molded.

A further object of the present invention is to provide an improved method of manufacturing a racquet frame, which allows molding together frame regions made of different materials, particularly in the vicinity of the string port holes.

It is also an object of the present invention is to provide an improved method of manufacturing a racquet frame, which is easy to carry out at relatively low cost.

Thus, the present invention provides a method for manufacturing at least a portion of a sports racquet frame that comprises a step a) of providing a moldable tube structure containing a first inflatable bladder and a second inflatable bladder. The first and second inflatable bladders are positioned on opposite first and second regions of the moldable tube structure. At an intermediate region, the tube structure comprises one or more cross channels, which pass through the moldable tube structure.

The method according to the present invention comprises also a further step b) of inserting said tube structure inside a mold forming a mold cavity of a desired shape. Mold members are inserted into the cross channels of the tube structure, so that the outer surface of the mold member faces the inner surface of the corresponding cross channel. The mold members have position and orientation that correspond to the position and orientation, along the string bed plane, of the string port holes, which are to be formed on said frame portion.

The method, according to the present invention, comprises also a step c) of pressurizing the first and second bladders, so that the tube structure conforms to the shape of the mold, and heating the mold, so that the tube structure cures.

The method, according to the present invention, comprises a further step d) of removing the cured tube structure from the mold cavity and removing the mold members from the cross channels.

Thus, the cured tube structure forms the portion of a sports racquet frame to be manufactured and the inner surface of the cross channel defines the string port hole formed on said frame portion.

Other features and advantages of the method according to the present invention, will become apparent from the following description of preferred embodiments, taken in conjunction with the drawings, in which.

Figure 3:
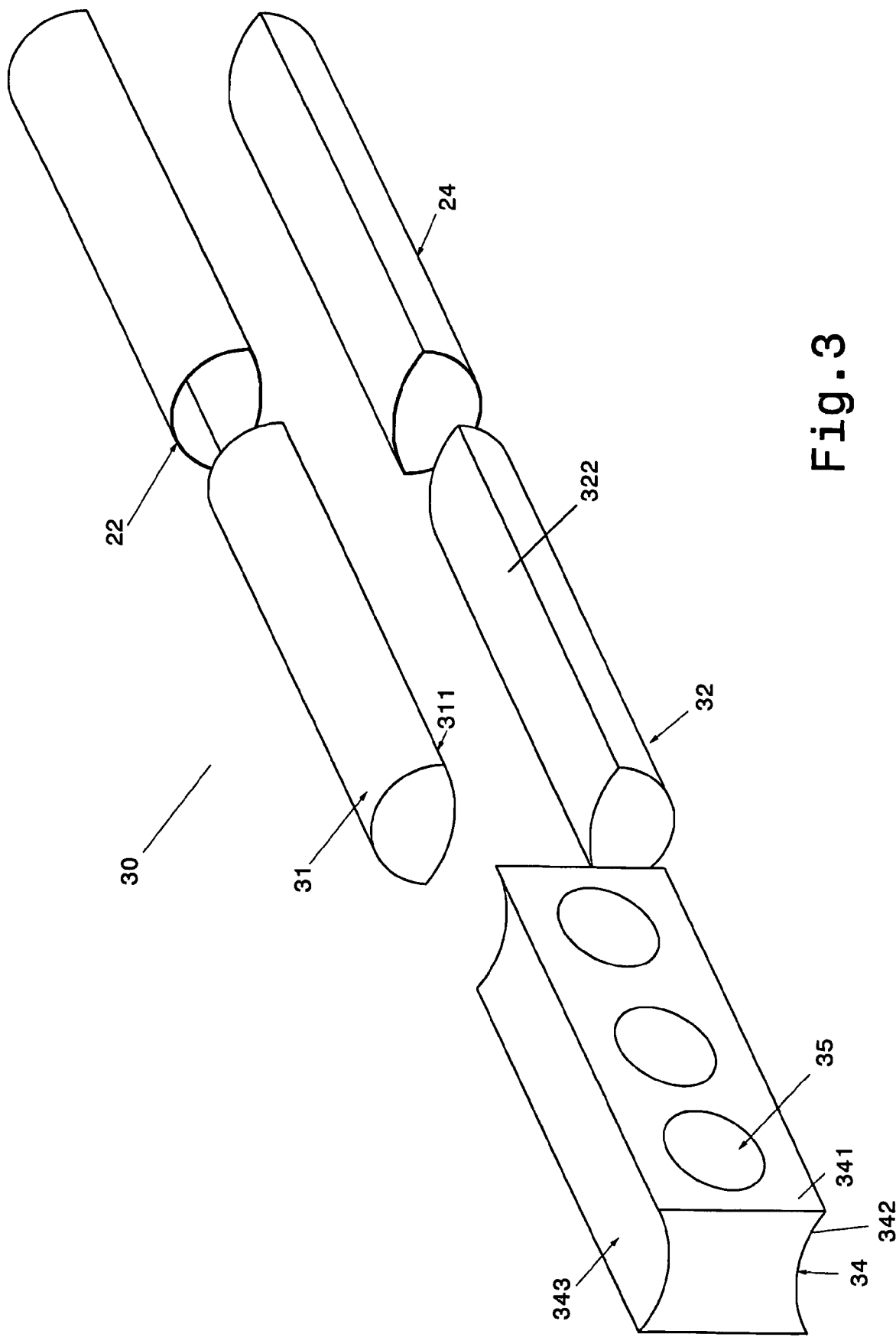
Figure 4:
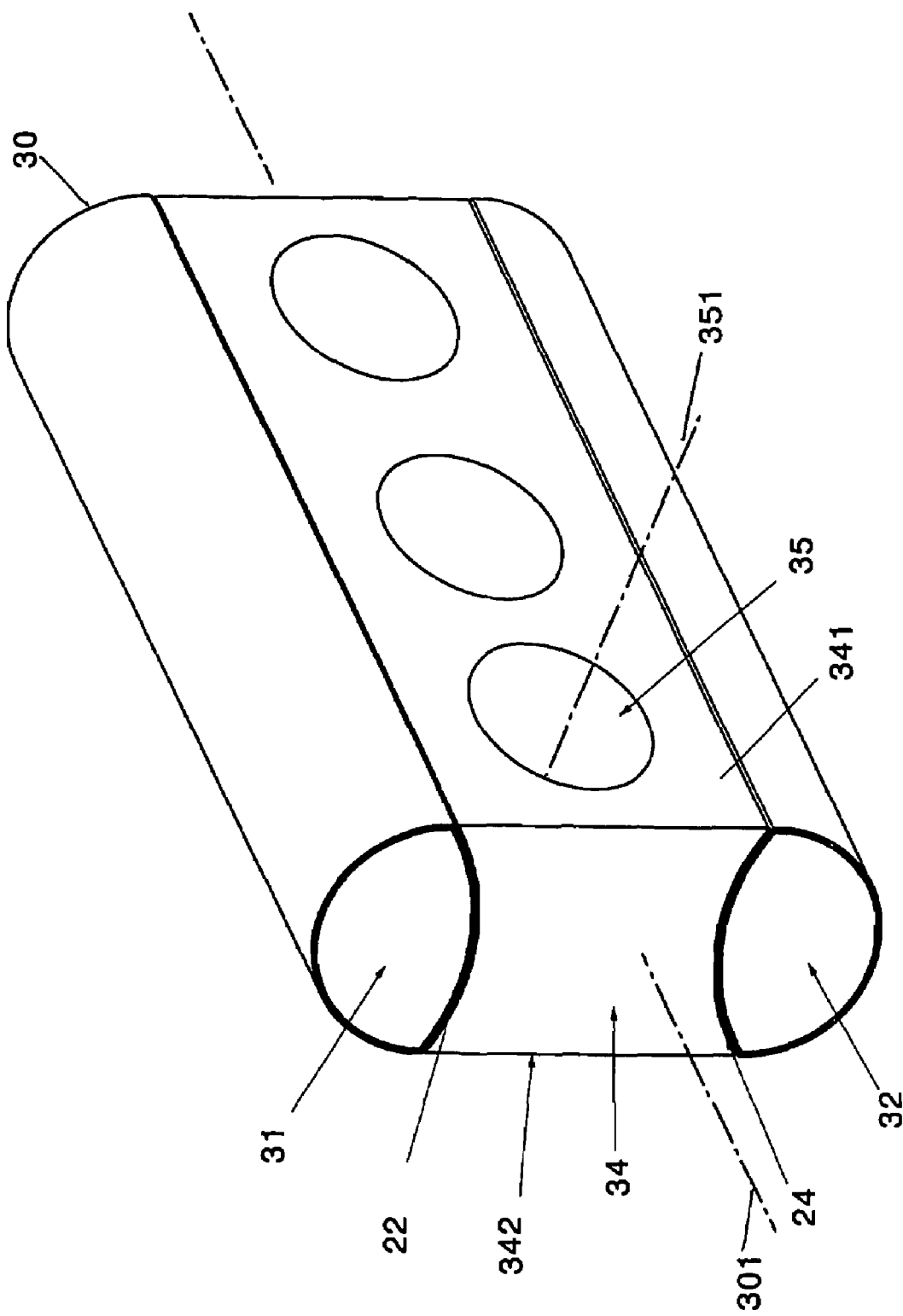
Figure 5:
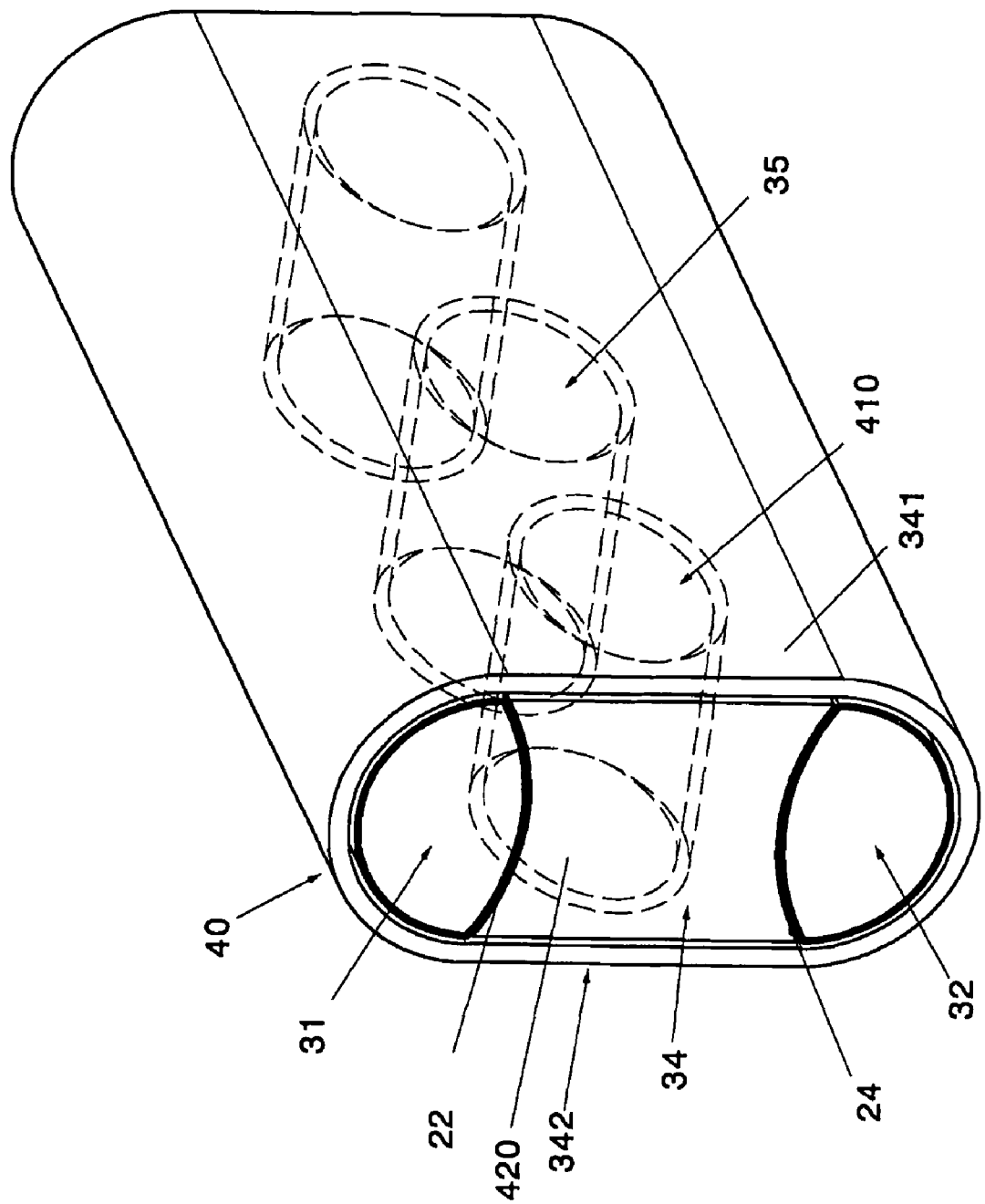
Figure 6:
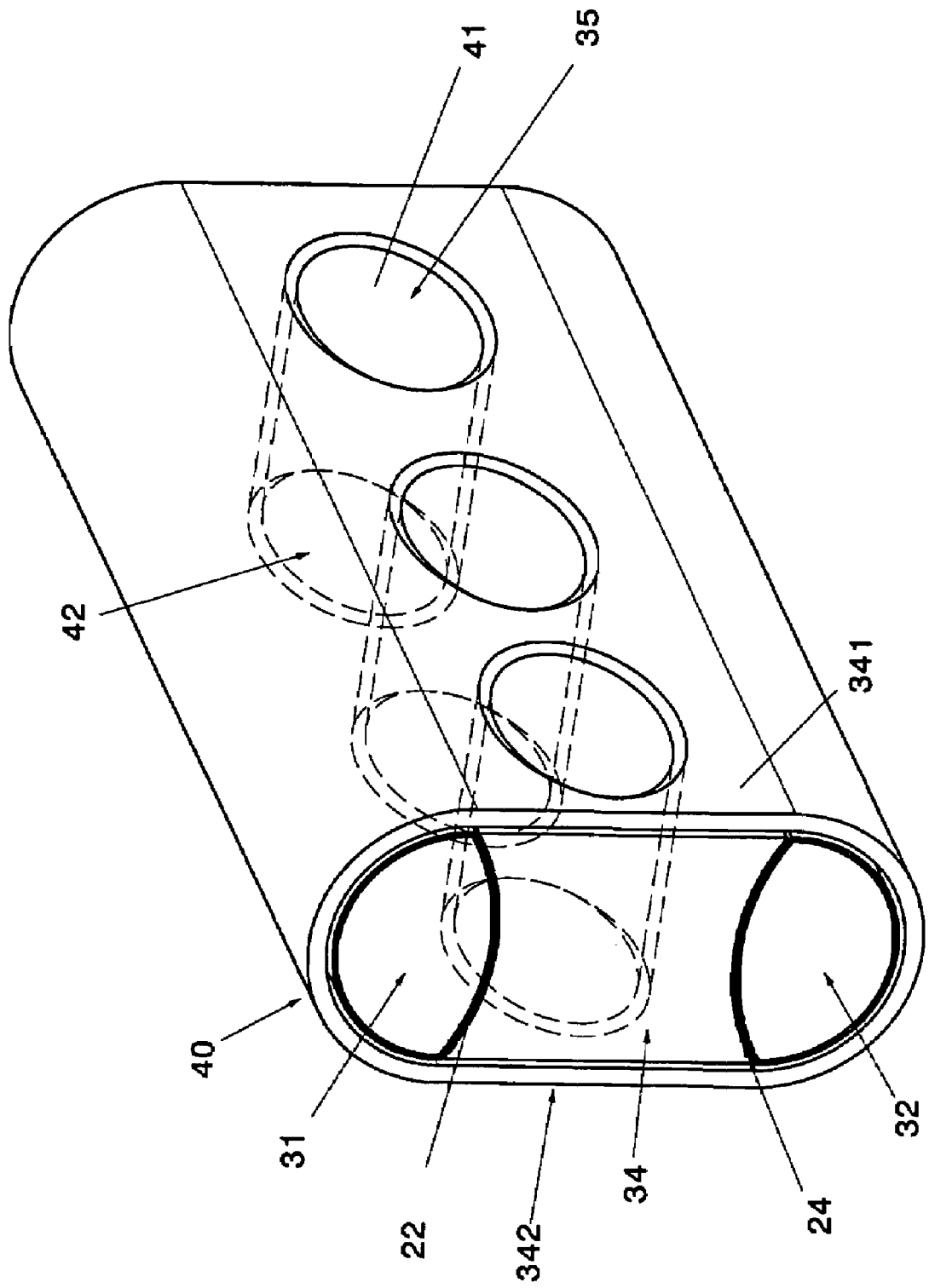
Figure 7:
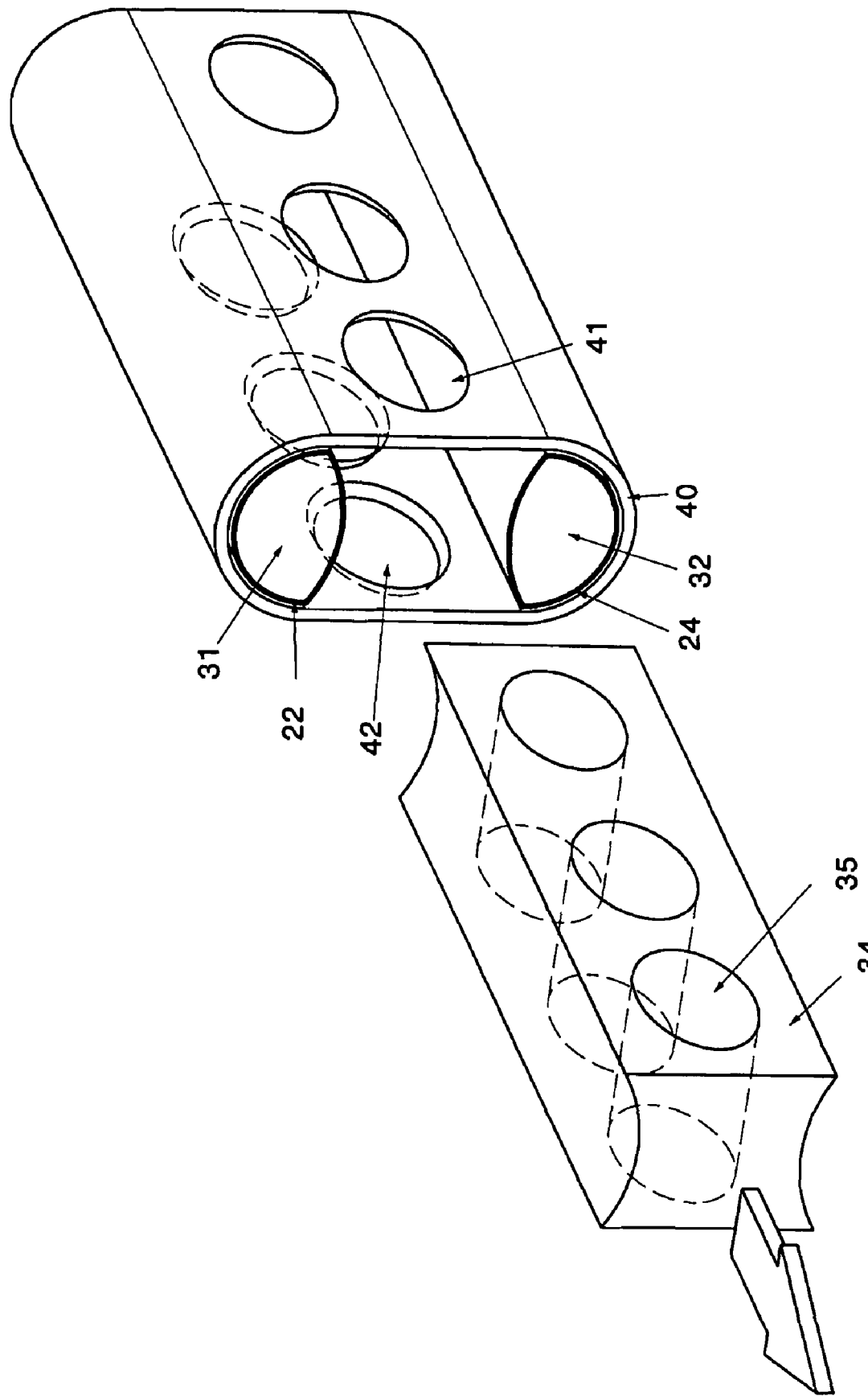
Figure 8:
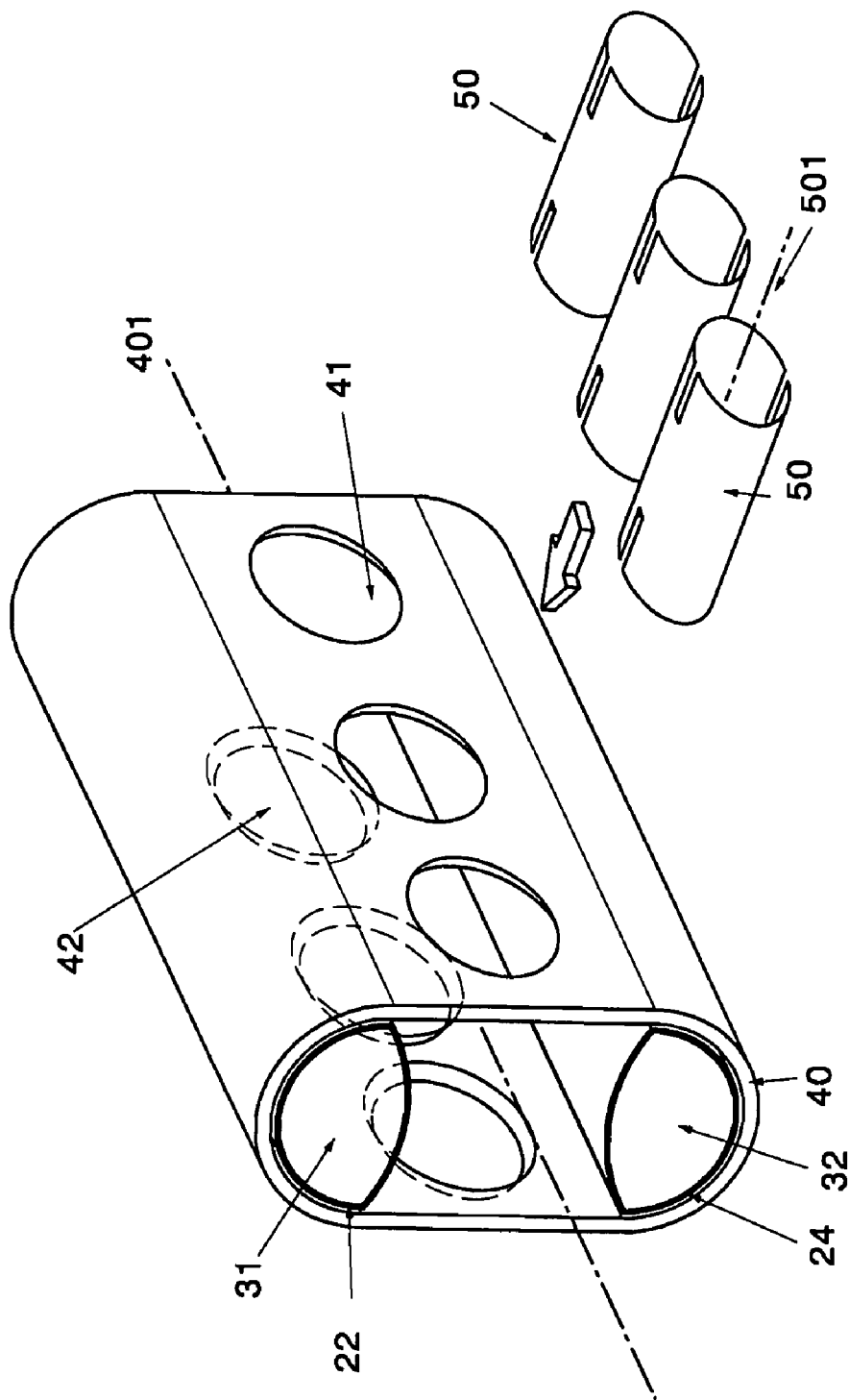
Figure 11:
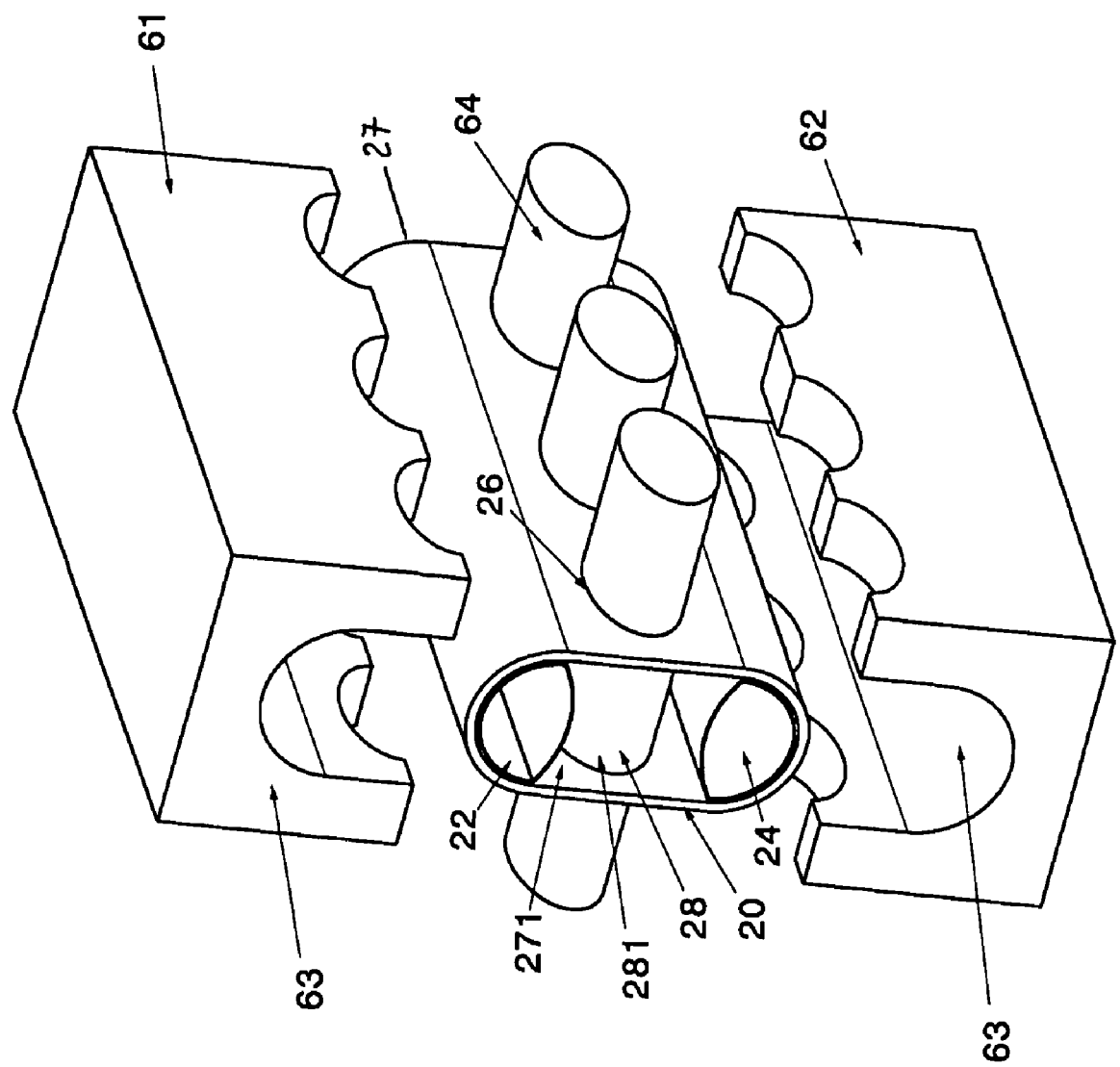
Figure 12:
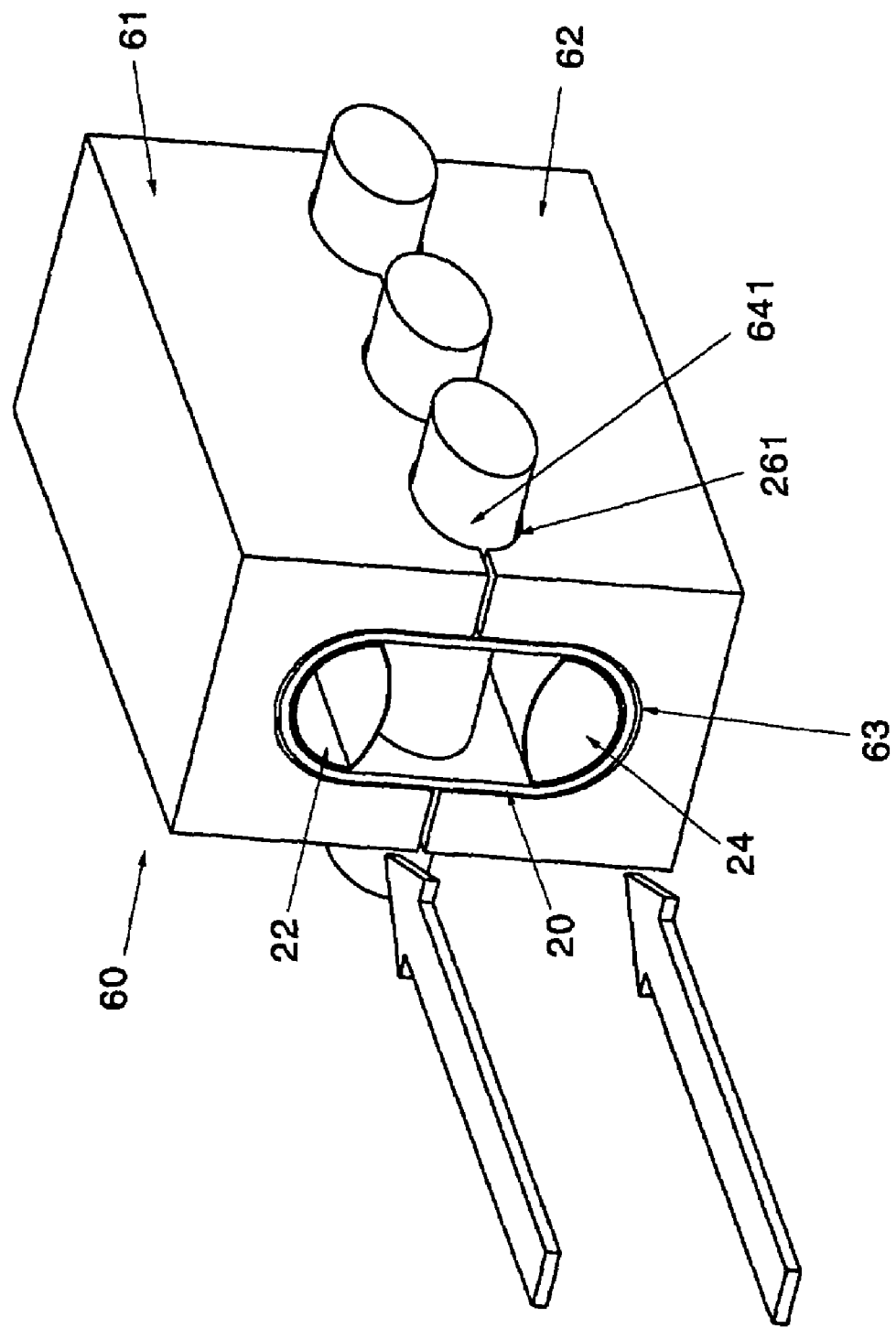

FIG. 3 schematically shows a manufacturing detail of a preferred embodiment of said first step of the method according to the present invention;

FIG. 4 schematically shows another manufacturing detail of a preferred embodiment of said first step of the method according to the present invention;

FIG. 5 schematically shows another manufacturing detail of a preferred embodiment of said first step of the method according to the present invention;

FIG. 6 schematically shows another manufacturing detail of a preferred embodiment of said first step of the method according to the present invention;

FIG. 7 schematically shows another manufacturing detail of a preferred embodiment of said first step of the method according to the present invention;

FIG. 8 schematically shows another manufacturing detail of a preferred embodiment of said first step of method according to the present invention; and FIGS. 9a and 9b schematically show two preferred embodiments of a tube support tube element that is used in the manufacturing step of FIG. 8; and FIG. 10 schematically shows another manufacturing detail of a preferred embodiment of said first step of method according to the present invention; and FIG. 11 schematically shows another manufacturing step of method according to the present invention; and FIG. 12 schematically shows another manufacturing step of method according to the present invention; and FIG. 13 schematically show a lateral view and two section views of a portion of the sports racquet frame obtained with the method, according to the present invention.

Figure 1:
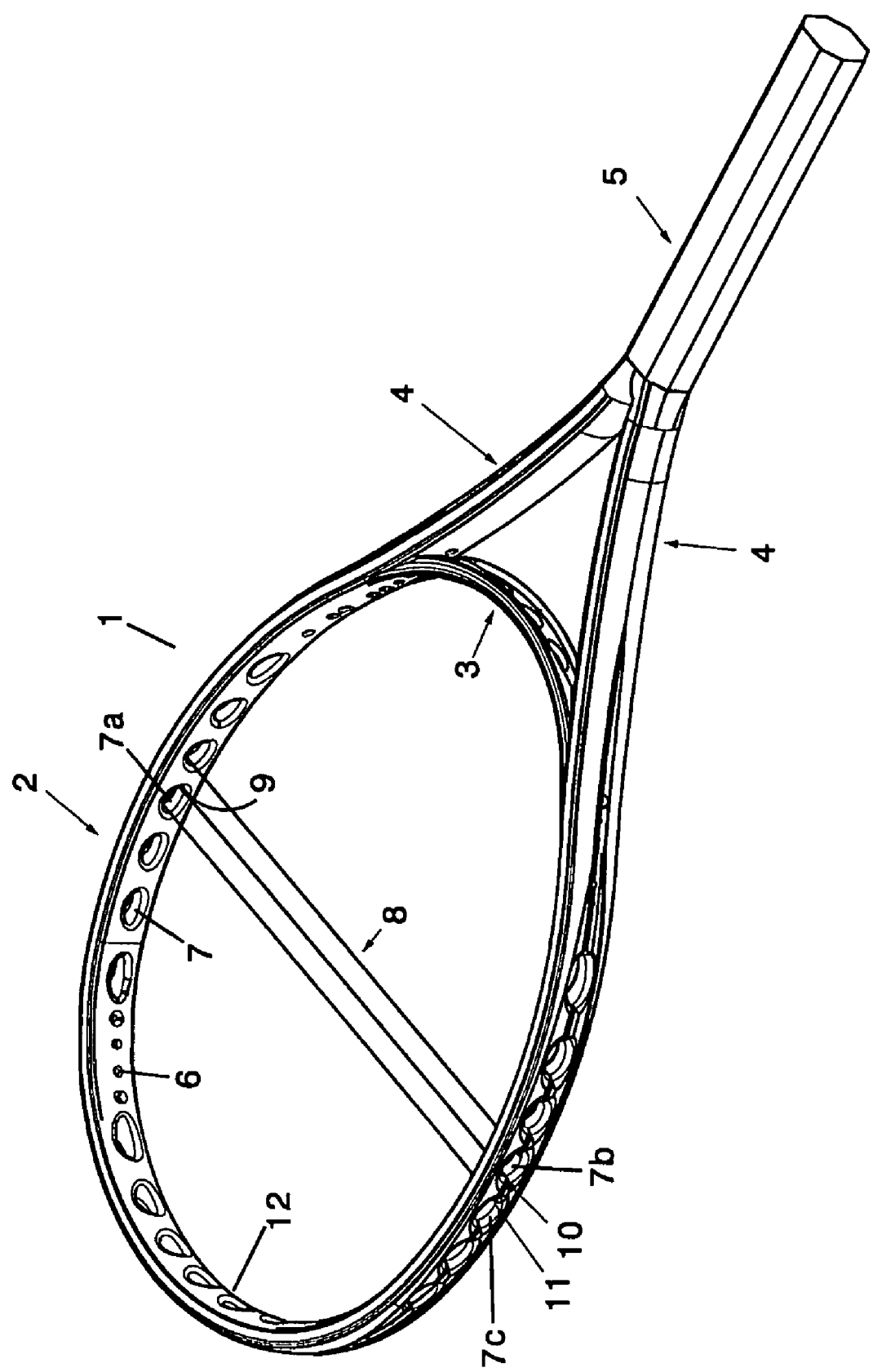
FIG. 1 is a perspective view of a sports racquet frame manufactured by the method, according to the present invention.

Referring to FIG. 1, it is shown a tennis racquet frame 1 manufactured with the method according to the present invention. The frame 1 includes a head portion 2, which includes a throat bridge 3 and a tip 12, a pair of converging shafts 4, and a handle portion 5. The head portion 2 includes a plurality of conventional string holes 6 and a plurality of consecutive port string holes 7. A handle (not shown) is mounted on the handle portion 5, and thereafter the handle may be wrapped with a grip. As described in greater detail in WO 2004/075996, which is incorporated herein by reference, string port holes 7 on opposite sides of the head 2, as well as opposed port string holes in the tip 12 and throat bridge 3, are offset relative to one another. In this manner, e.g., along the sides, a string segment 8, which bears against the lower bearing surface 9 of one port string hole 7a, after crossing the string bed, bears against the upper bearing surface 10 of the string port hole 7b, wraps around the outside surface of the head 10, and bears against the lower bearing surface 11 of the next adjacent port string hole 7c before again crossing the string bed. Such stringing is used both for the cross strings 8 and the interwoven main strings (not shown). The interwoven main and cross strings form a string bed laying substantially on a string bed plane, along which the port string holes 7 extend.

In a conventional inflation molding process, a prepreg tube, formed of sheets of uncured carbon fiber-reinforced epoxy resin, and containing an inflatable bladder, is placed inside of a mold which, when closed, has a cavity shaped as a sports racquet frame. After closing the mold, the bladder is inflated, so that the prepreg tube assumes the shape of the mold, and the mold is heated so as to cure the epoxy. The frame is then removed and string holes are drilled. The present invention relates to a different method to obtain such a racquet frame.

The method, according to the present invention, consists substantially of an inflation molding process, too. But this process is performed on a moldable tube structure 20 that is quite more complex with respect to a conventional prepreg tube. As it will be better seen later, the tube structure 20 can be made of different moldable and/or non-moldable materials. Further, the tube structure 20 is structured, so as to basically reproduce, before its curing, the whole structure of the portion 100 (FIG. 13) of racquet frame 1 to be formed, including the string port holes 7 formed therein.

Figure 2:
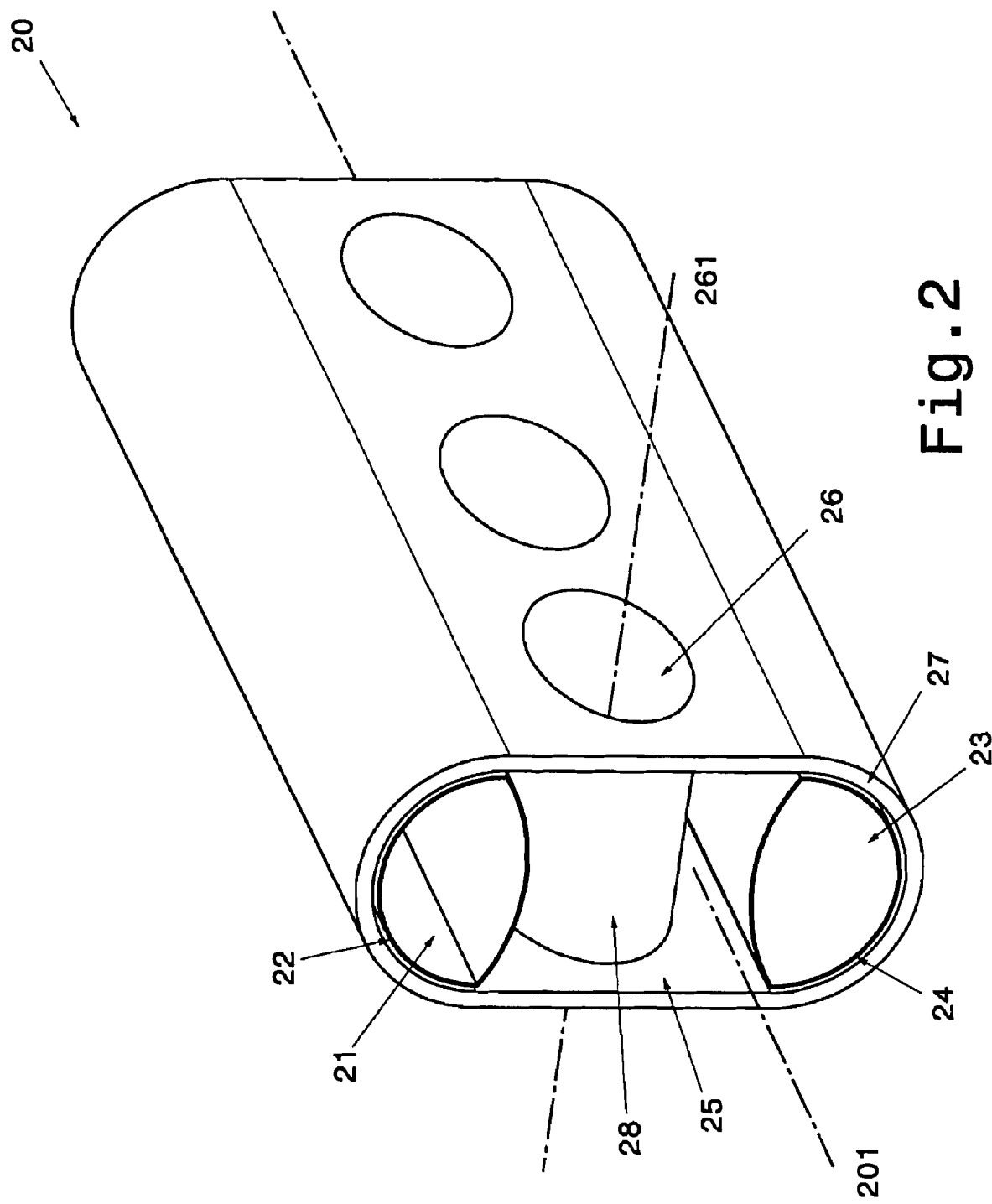
FIG. 2 is is a perspective view of a moldable tube structure relating to a manufacturing step of the method according to the present invention.

Referring to FIG. 2, the method, according to the present invention, in fact comprises a manufacturing step a) of providing the tube structure 20. The tube structure 20 comprises a first tube region 21 containing a first inflatable bladder 22. The tube structure 20 comprises also a second tube region 23 in an opposite position with respect to the first tube region 21. The second tube region 23 contains a second inflatable bladder 24. The tube structure 20 comprises also an intermediate tube region 25 that is positioned between the first tube region 21 and the second tube region 23. One or more cross channels 26, which pass through the tube structure at the intermediate tube region 25, are provided.

The shape of the tube structure 20 may be any, according to the needs. In particular, the shape of the cross channels may vary, in relation to the portion of racquet frame 100 to be formed. The cross channels 26 have main longitudinal axis 261, which intercepts the main longitudinal axis 201 of the tube structure 20 with a predefined angle. Each of the cross channels 26 may have a different shape and the axis 261 may be differently angled with respect to the axis 201, according to the needs. This may happen, for example, when the frame portion 100 to be formed relates to the throat bridge 3 or the converging shafts 4 of the racquet frame.

In other cases, for example when the frame portion 100 relates to the head 2 of the racquet frame, the cross channels 26 preferably have a cylindrical shape and a main longitudinal axis 261 that is substantially perpendicular with respect to the main longitudinal axis 201, as shown in the cited figures. Also, the number of channels 26 of the tube structure 26 may be any, depending on the number of string port holes 7 that are to be formed in the frame portion 100 that has to be molded.

The tube structure 20 can be wholly made of moldable material, such as, for example, a prepreg material. Alternatively, the materials forming the outer wall 27 of the tube structure 20 and of the inner walls 28, which define the channels 26, may be different. For example, the outer wall 27 may comprise a moldable prepreg material while the inner walls 28 may be made of one or more layers of moldable material (e.g. prepreg or a plastics material or the like) and/or one or more layers of non-moldable material (e.g. aluminum, wood, glass or the like). This solution is particularly advantageous since, as it will be better shown in the following, it makes it possible to obtain a racquet frame, which comprises co-molded regions of different materials, particularly at the string port holes. Thus, it is possible a higher flexibility in the design of the sports racquet frame, the mechanical proprieties of which may be easily changed/improved depending on the chosen materials.

Referring now to FIGS. 3-10, a preferred sequence of manufacturing steps a.1)-a.6) for obtaining the tube structure 20 is described.

In an initial step a.1), a chuck member 30 is provided. The chuck member comprises a first chuck element 31 and a second chuck element 32. The first chuck element 31 is inserted into the first inflatable bladder 22 and the second chuck element 32 is inserted into the second inflatable bladder 24. After the insertion into the respective bladders, the first chuck element 31 and the second chuck element 32 are associated to an intermediate chuck element 34. The surfaces 311 and 322 of the first and second chuck elements 31 and 32, are associated to the intermediate chuck element 34 respectively at its opposite sides 343 and 342. The coupling surfaces 311, 322, 343 and 344 may be complementary curved, as shown in FIG. 3, but they may have also a different shape, according to the needs. As a result, the chuck member 30 will substantially consist of the "sandwich" structure that is shown in FIG. 4. Such a sandwich structure comprises the superimposed first, intermediate and second chuck elements 31, 32 and 34 and the first and second inflatable bladders 22 and 24. Said bladders 22 and 24 are positioned respectively between the first chuck element 31 and the intermediate chuck element 34 and between the second chuck element 32 and the intermediate chuck element 34. Advantageously, the intermediate chuck element 34 comprises one or more couples of chuck cross cavities 35. Each couple of chuck cross cavities passes, at least partially, through the chuck member 30 at opposite sides 343 and 342 of the intermediate chuck element 34. Each cross cavity 35 may have a different shape and a main longitudinal axis 351, which is differently angled with respect to the main longitudinal axis 301 of the chuck member 30, according to the needs. Preferably, the chuck cross cavities 35 have a same longitudinal axis 351 that is substantially perpendicular with respect to the axis 301. Further, each couple of chuck cross cavities preferably forms a cross channel 35, which passes through the entire section of the intermediate element 34. The couples of chuck cross cavities or the chuck cross channels 35 on the intermediate chuck element 34 may be in any number, depending on the number of string port holes 7 that are to be formed on the frame portion 100.

A subsequent preferred step a.2) of inserting the chuck member 30 into a prepreg tube 40 is then performed. As it is shown in FIG. 5, the chuck member 30 is completely surrounded by the prepreg tube 40. In this manner, as better shown later, an easy insertion of the inflatable bladders 22 and 24 into the prepreg tube 40 is achieved.

It is then provided a further preferred step a.3) of removing predefined portions 410 and 420 of the prepreg tube 40. Particularly, the portions 410 and 420 are the portions of the prepreg tube 40, which cover the chuck cavities 35 respectively at the first side 341 and the second side 342 of the intermediate chuck element 34. The cross cavities 35 are used as guides or tracks for improving the precision of the removing process of step a.3), which may be, for example, a punching process or a laser cutting process.

In any case, at the end of step a.3), the prepreg tube 40 will be provided with one or more couples of opposite holes 41 and 42, which are positioned on opposite surfaces of the prepreg tube 40 that cover the corresponding opposite sides 341 and 342 of the intermediate chuck element 34 (FIG. 6). The shape of the opposite holes 41 and 42 may be any, according to the needs.

At a subsequent preferred step a.4), the intermediate chuck element 34 is removed from the prepreg tube 40 (FIG. 7).

Forming the holes 41 and 42 on the prepreg tube 40 may entail a weakening of the structure of the prepreg tube 40. Thus, on a following preferred step a.5) one or more tube support elements 50 are adopted to sustain the prepreg tube 40. Each support element 50 is inserted through a couple of opposite holes 41 and 42 of the prepreg tube 40 (FIGS. 8).

The shape of the support elements 50 may vary and they preferably have main longitudinal axis 501, which intercepts the main longitudinal axis 401 of the prepreg tube 40 with a predefined angle. Each of the support elements 50 may have a different shape and axis 501 differently angled with respect to the axis 401, according to the needs. Preferably, as shown in the cited figures, the support elements 50 are cylindrically shaped and have a longitudinal axis 501 that is substantially perpendicular with respect to the main longitudinal axis 401 of the prepreg tube 40. In FIG. 9a, it is shown a support element 50 comprising a single layer 502 while in FIG. 9b, it is shown a support element 50 comprising a two layers 503 and 504. Of course, a support element 50 may comprise also a different number of layers. In addition, the layers 502-504 may be made of a moldable or a non-moldable material.

Advantageously, each of the opposite ends 51 and 52 of the support element 50 may comprise an edge 53, which externally protrudes from the outer surface of the support element 50. The edge 53 can be obtained by folding the opposite ends 51 and 52 after having inserted the support element 50 into the holes 41 and 42. In alternative, the edge 53 may be preformed. The use of the edge 53 is particularly advantageous since it allows improving the joint between the support element 50 and the prepreg tube 40, thereby preventing from the arising of possible defects of the frame 100 in the vicinity of the string port hole 7, during the molding process.

Further, the edge 53 may protrude from the ends 51 and 52 with a sharp angle (not shown) or, preferably, with a certain radius of curvature (as shown in FIG. 9a). This last feature allows obtaining entrances to the string port holes 7, which are rounded and thus do not require the use of bumper or grommet strips or the need of abrasion operations on the molded frame.

Finally, it is performed the preferred step a.6) of removing the first and second chuck elements 31 and 32 respectively from the first and second inflatable bladders 22 and 24 and from the prepreg tube 40. The inflatable bladders 22 and 24 are thereby confined in two regions 45 and 46 of the prepreg tube 40, separated by an intermediate region 47 of the prepreg tube 40, at which the support elements 50 are inserted.

As a result of the preferred processing steps a.1)-a.6), the moldable tube structure 20 is thus obtained. The outer wall 27 of the tube structure 20 is formed by the prepreg tube 40. The inner walls 28, which define the channels 26 of the tube structure 20, are formed by the support elements 50. The regions 45, 46 and 47 correspond respectively to the mentioned regions 21, 23 and 25 of the tube structure 20.

After the tube structure 20 is provided, the method according to the present invention, comprise a sequence of manufacturing steps b)-d), which basically performs an inflatable molding process on the tube structure 20.

At a step b), the tube structure 20 is placed inside a mold 60, a portion of which is shown in FIGS. 11-12. Preferably, the mold 60 comprises two halves 61 and 62, which form a mold cavity 63 of the desired shape of the frame portion 100, when they are joined together. The mold cavity may not be perfectly oval as shown in FIGS. 11-12. For example, one wall of the mold cavity may be inwardly curved to form a string groove. One or more mold members 64 are inserted into the cross channels 26 of the tube structure 20. Each mold member 64 has an outer surface 641, which faces an inner surface 261 of the corresponding cross channel 26 (FIG. 12). Thus, the shape and orientation of the mold members 64 may be any, depending on the shape and orientation of the cross channels 26.

The use of the mold members 64 is particularly advantageous, since it allows forming the string port holes 7 during the molding of the frame portion 100. Thus, the mold members 64 will have position and orientation corresponding to the position and orientation of the string port holes 7, which are to be formed on the frame portion 100.

The method, according to the present invention provides a step c) of pressurizing the first and second bladders 22 and 24 (FIG. 12). In this manner, the tube structure 20 expands within the mold cavity 63 and it conforms to the shape of the mold 60. If a moldable material is used for the walls 28 of the channels 26, the inflation of the bladders 22 and 24 causes also the inner surface 261 of the channels 26 to conform to the shape of the outer surface 641 of the mold members 64. Additionally, thanks to the inflation of the bladders 22 and 24, the portions 271 of the outer wall 27 of the tube structure 20, in the vicinity of the ends of the channels 26, will stick to the end portions 281 of the inner walls 28 of the tube structure 20 and/or to the edges 53 provided in the support elements 50. This feature further reduces the arising of defects on the molded frame structure.

After the pressurization of the bladders 22 and 24, the mold 60 is then heated at a suitable temperature, such that the tube structure 20 cures.

At the following step d), the cured tube structure 20 is removed from the mold cavity 63 and the mold members are removed from the cross channels 26.

The cured tube structure 20 form the portion 100 of a sports racquet frame 1 and the inner surface 261 of the cross channels 26 define the inner surface of the string port holes 7, in particular the bearing surfaces 10 and 11.

The frame portion 100, resulting from the method according the present invention, is better shown in FIG. 13. At a cross section 102 along a section plane AA' that passes through a string port hole 7, the frame portion 100 comprises two separated cavities 102a and 102b, which are divided by the string port hole 7. The string port hole 7 is defined by the bearing surfaces 10 and 11. At a cross section 103 along a section plane BB' that does not pass through a string port hole 7, the frame portion 100 comprises a single cavity 101.

The foregoing represents preferred embodiments of the invention. Variations and modifications will be apparent to persons skilled in the art, without departing from the inventive concepts disclosed herein. For example, the port string holes 7 may have a round, oval, or otherwise curved cross sectional shape or other shapes such as rectangular shape. The port string holes 7 may have a main longitudinal axis along the string bed plane, which may be differently angled with respect to the main longitudinal axis of the frame portion 100, according to the needs. Thus, as already stated above, also the shape and orientation of the channels 26, of the chuck cross cavities 35, of the support elements 50 and of the mold members 64 may be any, according to the needs. The method, according to the present invention may therefore be adopted for manufacturing any portion 100 of the sports racquet frame 1. Thus, it may be used to manufacture portions of the head 10, of the throat bridge 12, of the shafts 14 and of the handle 16 of the sports racquet frame 1. The method according to the present invention may be used to obtain also string holes having the same cross section of conventional string holes 18. To this aim, it is sufficient to reduce the section of the corresponding channels 26 of the tube structure 20.

Grommet members may be selected to change the weight, balance, and moments of inertia (mass and polar) of the racquet. Conventional grommet or bumper strips are preferably used with the conventional string holes, since these may still have sharp edges, which could otherwise damage the strings, given the fact that they have a very small diameter.

The method according to the present invention allows achieving the intended aim and objects. Enlarged string holes on the racquet frame are easily obtainable with the method according to the present invention. This allows the overall weight of the racquet to be reduced and makes stringing easier. Enlarged string holes also improve the performance of the racquet, reduce production costs, vibration, and shock, and improve comfort. The enlarged holes are obtained with a single molding operation without the need of removing portions of the racquet frame after the molding process is completed. It therefore possible to avoid those post-curing operations, such as drilling, which may weaken or damage the molded racquet frame.

This feature allows maintaining unchanged the structural integrity of the racquet frame, thereby improving its mechanical properties. Furthermore, it is possible to provide a racquet frame with regions of different materials, particularly at the string port holes. Thus, with an appropriate choice of materials, it is possible to further improve the mechanical properties of the racquet frame. From the above description, it is evident that the method according to the present invention can be carried out in a simple manner, which is particularly suitable for industrial implementation and processing. This feature allows reducing the production costs of the racquet frame.

The invention claimed is:

1. A method for manufacturing at least a frame portion of a sports racquet frame having at least a string port hole formed therein, said frame having a string bed plane, along which said string port hole extends, wherein said method comprises the following manufacturing steps:

a) providing a moldable tube structure, which comprises a first tube region containing a first inflatable bladder, a second tube region containing a second inflatable bladder and an intermediate tube region that is located between said first tube region and said second tube region, said tube structure comprising at least a cross channel, which passes through said tube structure at said intermediate tube region;

b) placing said tube structure inside a mold which, when closed, forms a mold cavity of the desired shape of said frame portion, at least a mold member being inserted into said cross channel, said mold member having an outer surface, which faces an inner surface of said cross channel, said mold member having position and orientation that correspond to the position and orientation of said string port hole, along said string bed plane;

c) pressurizing said first and second bladders, so that said tube structure conforms to the shape of the mold and heating said mold, such that said tube structure cures; and d) removing said cured tube structure from said mold cavity and removing said mold member from said cross channel, said cured tube structure thereby forming said frame portion, said cross channel thereby forming said string port hole; and wherein said step a), of providing said moldable tube structure, further comprises the following manufacturing steps:

a.1) providing a chuck member, which comprises a first chuck element that is inserted into said first inflatable bladder, a second chuck element that is inserted into said second inflatable bladder, and an intermediate chuck element between said first chuck element and said second chuck element;

a.2) disposing said chuck member within a prepreg tube, so as to be completely surrounded by said prepreg tube;

a.3) removing predefined portions of said prepreg tube, at said first opposite sides of said intermediate chuck element, so as to form at least a couple of opposite holes on the opposite surfaces of said prepreg tube, which cover said first opposite sides of said intermediate chuck element;

a.4) removing said intermediate chuck element from said prepreg tube;

a.5) inserting at least a tube support element through said couple of opposite holes of said prepreg tube; and a.6) removing said first and second chuck elements respectively from said first and second inflatable bladders and from said prepreg tube.

2. A method according to claim 1 wherein, in said step a.1) of providing said chuck member, said first chuck element and said second chuck element are associated to said intermediate element at second opposite sides of said intermediate element, the coupling of said first element and said second element to said intermediate element being performed after having inserted said first element and said second element respectively into said first inflatable bladder and said second inflatable bladder.

3. A method according to claim 2, wherein, in said step a.1) of providing said chuck member, said intermediate chuck element comprises at least a couple of chuck cross cavities, which pass at least partially through said intermediate chuck element at first opposite sides of said intermediate chuck element.

4. A method according to claim 3, wherein, in said step a.3) of removing predefined portions of said prepreg tube, said predefined portions are the portions of the prepreg tube, which cover said chuck cross cavities at said first opposite sides of said intermediate chuck element.

5. A method according to claim 4, wherein, in said step a.5) of inserting said tube support element, said support element comprises one or more layers of moldable material and/or one or more layers of non-moldable material.

6. A method according to claim 1, wherein said moldable tube structure comprises an outer wall, which defines the external perimeter of said tube structure, and at least an inner wall, which defines said at least a cross channel passing through said tube structure.

7. A method according to claim 6, wherein said cross channel has a main longitudinal axis, which intercepts the main longitudinal axis of said tube structure with a predefined angle.

8. A method according to claim 7, wherein said cross channel has a main longitudinal axis that is substantially perpendicular with respect to the main longitudinal axis of said tube structure.

9. A method according to claim 6, wherein said inner wall comprises one or more layers of moldable material and/or one or more layers of non-moldable material.

10. A method according to claim 7, wherein said inner wall comprises one or more layers of moldable material and/or one or more layers of non-moldable material.

11. A method according to claim 8, wherein said inner wall comprises one or more layers of moldable material and/or one or more layers of non-moldable material.

* * * * *